United States Patent
Ong et al.

(10) Patent No.: US 6,803,136 B2
(45) Date of Patent: Oct. 12, 2004

(54) STACKING AND MANIFOLDING OF UNITIZED SOLID OXIDE FUEL CELLS

(75) Inventors: Estela Ong, Rolling Hills Estates, CA (US); Nguyen Minh, Fountain Valley, CA (US)

(73) Assignee: Hybrid Power Generation Systems, LLC, Torrance, CA (US)

( * ) Notice: Subject to any disclaimer, the term of this patent is extended or adjusted under 35 U.S.C. 154(b) by 271 days.

(21) Appl. No.: 09/827,843

(22) Filed: Apr. 5, 2001

(65) Prior Publication Data

US 2001/0028973 A1 Oct. 11, 2001

Related U.S. Application Data

(63) Continuation-in-part of application No. 09/546,308, filed on Apr. 10, 2000, now Pat. No. 6,500,578.

(51) Int. Cl.[7] .............................. H01M 8/12; H01M 8/02
(52) U.S. Cl. ................................ 429/30; 429/32; 429/34
(58) Field of Search .............................. 429/30, 32, 34, 429/38, 39, 33

(56) References Cited

U.S. PATENT DOCUMENTS

| | | | |
|---|---|---|---|
| 4,048,385 A | | 9/1977 | Regnaut |
| 4,476,196 A | * | 10/1984 | Poeppel et al. ............... 429/32 |
| 4,476,197 A | * | 10/1984 | Herceg ......................... 429/32 |
| 4,596,748 A | * | 6/1986 | Katz et al. .................... 429/13 |
| 4,659,559 A | * | 4/1987 | Struthers ...................... 429/46 |
| 4,857,420 A | * | 8/1989 | Maricle et al. ................ 429/30 |
| 4,876,163 A | | 10/1989 | Reichner |
| 4,910,100 A | | 3/1990 | Nakanishi et al. |
| 5,298,341 A | | 3/1994 | Khandkar et al. |
| 5,851,689 A | * | 12/1998 | Chen ............................. 429/13 |
| 5,861,221 A | | 1/1999 | Ledjeff et al. |
| 6,280,869 B1 | * | 8/2001 | Chen ............................. 429/34 |

FOREIGN PATENT DOCUMENTS

| | | | | |
|---|---|---|---|---|
| JP | 57138782 A | * | 8/1982 | ............ H01M/8/24 |
| JP | 04342439 A | * | 11/1992 | ............ C03C/8/24 |
| JP | 09326259 A | * | 12/1997 | ............ H01M/8/02 |

* cited by examiner

*Primary Examiner*—Gregg Cantelmo
(74) *Attorney, Agent, or Firm*—Sutherland Asbill & Brennan LLP (57) ABSTRACT

A fuel cell stack comprises a plurality of planar fuel cells in a spiral configuration. The fuel cells angularly offset from one another such that immediately adjacent cells only partially overlap one another. The cells are preferably of the unitized type. A manifold assembly is operatively adjacent to the fuel cells. The manifold assembly includes an inlet manifold and an outlet manifold for each of the gases that are in communication with the fuel cells. The unitized solid oxide fuel cell comprises a first planar interconnect, a planar ceramic cell adjacent the first planar interconnect, a second planar interconnect adjacent the opposite side of the planar ceramic cell, and a plurality of gas tubes adjacent the planar ceramic cell. The gas tubes are arranged to a first configuration, a second configuration, a third configuration and a fourth configuration with a cylindrical gas tube shape and a T-shape gas tube designs. These configurations provide a choice of co-flow, cross flow or counter flow patterns inside the cell to improve the thermal management and cell efficiency and provide more flexibilities to connect a manifold assembly. They also provide an option to directly combust the spent fuel just outside the fuel cell to eliminate a separate burner for residual energy recovery. These configurations thus provide means for improved fuel cell power system efficiency and lowered capital and operational costs.

28 Claims, 9 Drawing Sheets

STACKING AND MANIFOLDING OF UNITIZED SOLID OXIDE FUEL CELLS

CROSS-REFERENCE TO RELATED APPLICATIONS

This application is a continuation-in-part of U.S. patent application Ser. No. 09/546,308 filed Apr. 10, 2000 now U.S. Pat. No. 6,500,578.

BACKGROUND OF THE INVENTION

The present invention generally relates to planar, solid oxide fuel cells and, more particularly, to an apparatus and method of stacking and manifolding unitized solid oxide fuel cells for ready connection and disconnection of gases to manifolds.

A fuel cell is basically a galvanic conversion device that electrochemically reacts a fuel with an oxidant within catalytic confines to generate a direct current. A fuel cell typically includes a cathode material that defines the reaction for the oxidant and an anode material that defines the reaction for the fuel. An electrolyte is sandwiched between and separates the cathode and anode materials. An individual electrochemical cell usually generates a relatively small voltage. Thus, to achieve higher voltages that are useful, the individual electrochemical cells are connected together in series to form a stack. Electrical connection between cells is achieved by the use of an electrical interconnect between the cathode and anode of adjacent cells. The interconnect also normally contains gas passageways for the electrodes as well as ducts or manifolding to conduct the fuel and oxidant into and out of each cell in the stack.

As the fuel and oxidant gases are continuously passed through their respective passageways, electrochemical conversion occurs at or near the three-phase boundary of the gas, the electrodes (cathode and anode) and electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Specifically, in a solid oxide fuel cell (SOFC), the fuel reacts with oxide ions on the anode to produce electrons and water, the latter of which is removed in the fuel flow stream. The oxygen reacts with the electrons on the cathode surface to form oxide ions that are conducted through the electrolyte to the anode. The electrons flow from the anode through an external circuit and then to the cathode. The circuit is closed internally by the transport of oxide ions through the electrolyte.

In a SOFC, the electrolyte is in a solid form. Typically, the electrolyte is made of a nonmetallic ceramic, such as dense yttria-stabilized zirconia (YSZ) ceramic, that is a nonconductor of electrons that ensures that the electrons must pass through the external circuit to do useful work. As such, the electrolyte isolates the fuel and oxidant gases from one another and allows a potential to build up across it as a result of the difference in electrochemical potential between the fuel and the oxidant. The anode and cathode are generally porous, with the anode oftentimes being made of nickel/YSZ cermet and the cathode oftentimes being made of doped lanthanum manganite. In the solid oxide fuel cell, hydrogen or a hydrocarbon derived gas is commonly used as the fuel, while oxygen or air is used as the oxidant.

As mentioned above, the voltage output of a single fuel cell is far too low for many applications. Thus, It frequently becomes necessary to connect multiple fuel cells in series to obtain high voltage power. Additionally, the power demands of many systems require that fuel cells frequently be connected in electrically parallel circuits, thereby providing a greater total current. The physical stacking of multiple fuel cells in series, parallel or series/parallel configuration, however, must incorporate gas-tight connections to allow for a safe and efficient flow of reaction gases. Typically, a group of individual fuel cells are welded, soldered or otherwise bonded together into a single unitary stack, thereby preventing the improper mixing of the reaction gasses, such as in U.S. Pat. No. 5,861,221.

For any given cell, defects can occur during processing. A cell can also become damaged during handling. Because some defects may have been undetected, their negative affects, such as poor performance and consequent effects on its neighboring cells or even the entire stack, are not realized until the cell is placed in the stack. Where adjacent cells are fused or bonded together into a single unitary stack, a single cell that is defectively formed cannot be removed and interchanged with a non-defective cell. At best, the performance of the fuel cell stack becomes impaired. At worst, the entire stack must be discarded due to the failure of a single cell.

In addressing the above drawbacks, the assignee of the present invention has developed a unitized fuel cell that is the subject of U.S. patent application Ser. No. 09/419,343 filed Oct. 15, 1999. The unitized cell includes a first electrically conductive interconnect operatively connected to an anode of the fuel cell. The first interconnect has a first substantially planar portion and a first skirt portion. A second electrically conductive interconnect is operatively connected to a cathode of the fuel cell. The second interconnect has a second substantially planar portion and a second skirt portion, with the second skirt portion being juxtaposed to the first skirt portion. A first salient is formed by a portion of at least one of the first and second skirt portions, with the first salient being disposed at a first edge of the fuel cell. A second salient is formed by a portion of at least one of the first and second skirt portions, with the second salient being disposed at a second edge of the fuel cell. An insulating gasket is disposed between the first and second skirt portions and against the ceramic cell to seal the gases within their respective cell housings. The first and second salients can be attached to a gas manifold by attaching a tube to the skirt of the metal housing. Thus, the fuel cell can be electrically connected with other fuel cells in series and parallel configurations through contacts between metal housings and/or through metal gas manifold tubings. A series connection is made when the anode interconnect of one cell is made in contact with the cathode of its adjacent cell whereas a parallel connection can be made if a metal gas tubing is used to electrically connect similar electrodes of two different cells.

While the use of unitized fuel cells solves many drawbacks in the prior art, design issues relating to the actual stacking and manifolding of fuel cells remain. For example, U.S. Pat. No. 5,298,341 describes prior art as including fuel cell stacks that are arranged in a block configuration. With the stacks positioned adjacent to one another, a manifold is attached to all gas channels of the same orientation. Another prior art design is described as manifolding each stack individually. However, both prior art designs are described as having numerous disadvantages. Thus, U.S. Pat. No. 5,298,341 provides a module having stacks of fuel cells. The fuel cells in each stack are arranged to provide an overall rectangular configuration to the stack. The stacks are oriented on edge and radially spaced apart around a central plenum. The fuel cells in the stacks have gas passageways that extend parallel and perpendicular to the longitudinal axis of the plenum. Circular manifold plates are positioned above and below the module. Each plate has gas flow apertures that coincide with the position of the stacks and a plenum aperture that coincides with the position of the central plenum. In this design, individual stacks may be replaced or repaired but it will be difficult to remove individual cells without affecting the integrity of the neighboring cells.

In U.S. Pat. No. 4,048,385, manifolding is directed to planar, cylindrical shaped fuel cells. The cells include a central active portion surrounded by a frame portion. The frame portions contain duct openings so that when the cells are in a stack, the combined frame portions provide channels extending parallel to the longitudinal axis of the stack. The channels provide inlet and outlet means for different gases. Hollowed out portions in the frame portions allow the passage of gases between the channels and active portions. End plates are then used to sandwich the above components. In this design, holes around the perimeter of the cell can become weak spots that may cause the cell to fracture when placed under the stress of a stack assembly.

Another example of manifolding is in U.S. Pat. No. 4,876,163 that discloses tubular shaped fuel cells with their longitudinal axes aligned parallel to one another. Having such parallel orientation, the fuel cells are arranged in either concentric circles, a spiral, or folded rows. Manifolds are located at the distal ends of the cells. The arrangement was intended to reduce the flow of heat from an interior location of the fuel cell stack to a peripheral location. It was also intended to enable series connection. This design, while being applicable to tubular cells, is not applicable to planar cells.

As can be seen, there is a need for an improved solid oxide fuel cell stack and method of stacking such cells. Another need is for a planar, solid oxide fuel cell stack that provides improved stacking and manifolding. A further need is for a stack design that incorporates unitized fuel cells. Also needed is a fuel cell stack design that minimizes the footprint of the stack. Yet another need is for a fuel cell stack design that allows easy connection and disconnection of gases to the stack.

SUMMARY OF THE INVENTION

In one aspect of the present invention, a unitized solid oxide fuel cell comprises a planar first interconnect that allows a first gas to flow therein; a planar ceramic cell adjacent the first interconnect; a planar second interconnect adjacent the ceramic cell, with the second interconnect allowing a second gas to flow therein; and a plurality of gas tubes in gas communication with the ceramic cell. The gas tubes comprise a first gas inlet affixed to the first interconnect; a second gas inlet affixed to the second interconnect; a first gas outlet in communication with the first gas inlet; and a second gas outlet in communication with the second gas inlet.

These and other features, aspects and advantages of the present invention will become better understood with reference to the following drawings, description and claims.

DETAILED DESCRIPTION OF THE INVENTION

While the present invention is described below in the context of solid oxide fuel cells, the present invention may also be used in the context of other types of fuel cells. Further, even though the present invention contemplates that each of the fuel cells 10 in a fuel cell stack 23 be identical, it is also contemplated that the cells 10 can be different. For example, one intermediate cell may serve a special purpose, such as for cooling, containing catalyst, gas conditioning, and others, and thus designed differently from the rest of the cells.

Figure 1:
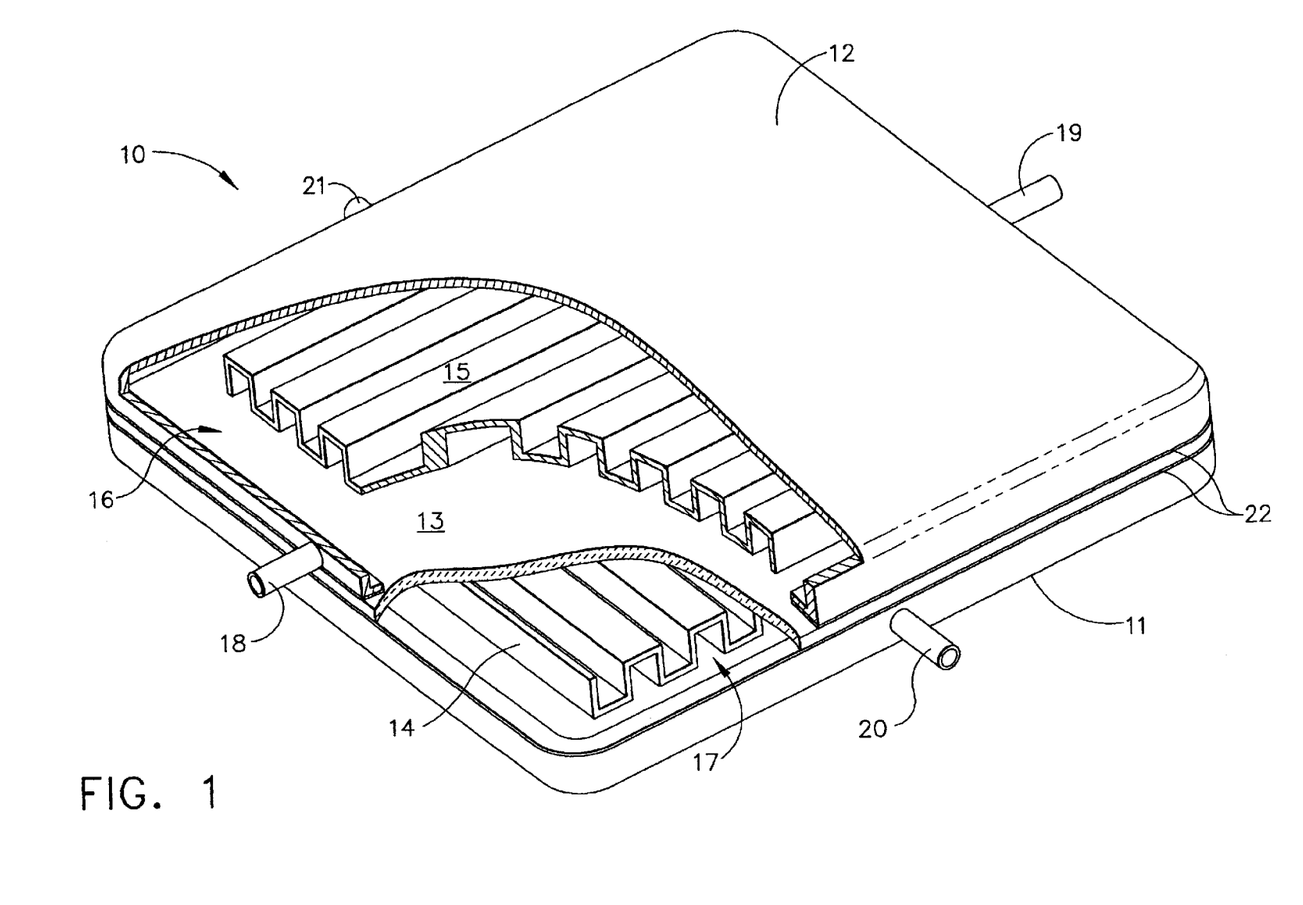
FIG. 1 is a perspective view of a unitized fuel cell that can be incorporated into a fuel cell stack according to the present invention.

FIG. 1 depicts one embodiment of a fuel cell 10 that can be utilized in a fuel cell stack 23 in accordance with the present invention. The cell 10 is characterized as being "unitized." This is intended to generally mean a self-contained fuel cell that can be replaced from a fuel cell stack without impairing the performance of the overall stack, such as by damaging adjoining cells. In FIG. 1, the unitized fuel cell 10 is shown as having a rectangular and planar configuration. However, shapes other than rectangular are contemplated.

The fuel cell 10 includes a first planar interconnect 11 that interfaces a second planar interconnect 12. The first and second interconnects 11, 12 sandwich therebetween a first gas distribution structure 14, a ceramic cell 13, and a second gas distribution structure 15. In general, and in the context of a solid oxide fuel cell, the ceramic cell 13 is constructed with an anode layer, a cathode layer, and an electrolyte layer therebetween according to any well-known construction in the art. The first and second gas distribution structures 14, 15 can be portions of the first and second interconnects 11, 12, respectively. Alternatively, the first and second gas distribution structures 14, 15 can comprise electrodes, such as an anode and cathode, as is also known in the art.

First gas channels are provided by the first gas distribution structure 14 and second gas channels are provided by the second gas distribution structure 15. The first and second gas channels enable gases, such as a fuel and an oxidant, to flow therein. In this embodiment, the first and second gas channels are oriented perpendicular to one another to provide a cross flow of gases. Channels may also be oriented parallel to each other to provide co-flow or counterflow of gases. A first salient 16, a second salient (not shown), a third salient 17, and a fourth salient (not shown) are formed between the outer perimeter of the fuel cell 10 and the first and second gas distribution structures 14, 15.

A pair of opposing salients enables a gas, such as an oxidant, to pass through the fuel cell 10 via an oxidant inlet 18 and an oxidant outlet 19. Likewise, a gas, such as a fuel, is able to pass through the fuel cell 10 via a fuel inlet 20 and a fuel outlet 21. Even though the inlets 18, 20 and the outlets 19, 21 are shown as being generally at the mid-point between the corners of the cell 10, their positions can be different, such as at the corners. The entire cell 10 is then sealed by a gasket 22 between the first and second interconnects 11, 12 and against the edge of the ceramic cell 13. The gasket 22, along with the ceramic cell, also electrically insulates the first metal interconnect 11 from the second metal interconnect 12.

Figure 2:
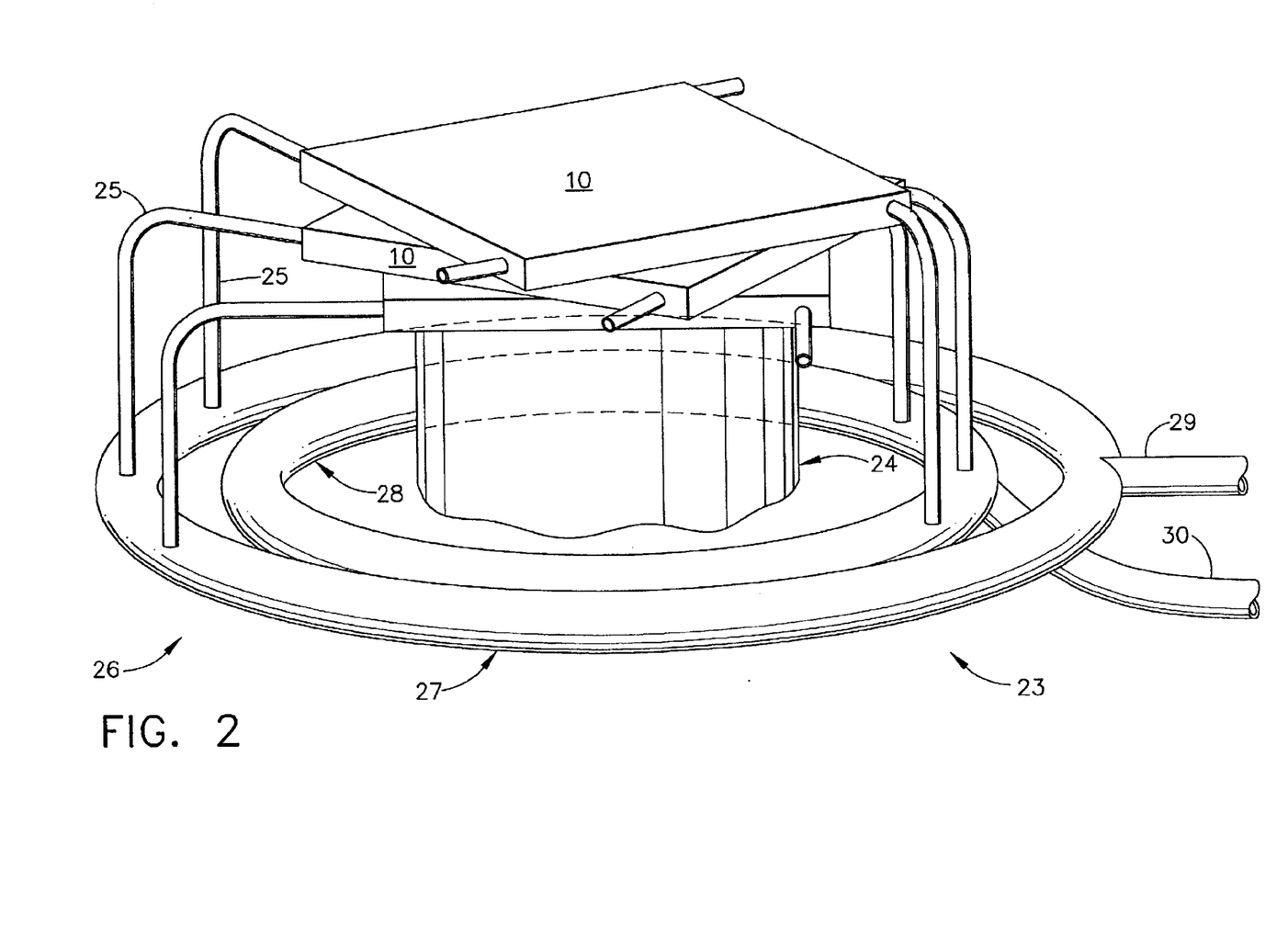
FIG. 2 is a perspective view of a partial fuel cell stack according to the present invention.

FIG. 2 depicts one embodiment of a fuel cell stack 23. However, for ease of illustration, only a portion of the fuel stack 23 is depicted. The stack 23 includes a plurality of fuel cells 10 that are positioned in respective planes that are generally parallel to one another. In particular, the first and second interconnects 11, 12 of each cell 10 preferably lie in their respective plane. The overall configuration of the cells 10 may be generally described as spiral. In such a configuration, the cells 10 are angularly offset to one another about an axis that extends perpendicular to the planes in which the cells 10 lie. The amount of angular offset can vary, depending upon the desired cell 10 density. Thus, a higher cell 10 density will require a smaller offset, while a lower cell 10 density will allow a higher offset.

The embodiment of FIG. 2 depicts each of the immediately adjacent cells 10 as only partially overlapping one another. In other words, the outer perimeter of one cell 10 does not completely match the angular position of the outer perimeter of an immediately adjacent cell 10. The partial overlap provides ease of manifolding and thermal distribution as further described below. However, it can be appreciated that as the number of cells 10 increases, the cells 10 may eventually circle around in the spiral such that non-immediately adjacent cells 10 will completely overlap. For example, if it takes twenty cells 10 to complete a circle, the first cell 10 and the 20$t^h$ cell 10 will completely overlap. While the foregoing is a preferred embodiment, it is also contemplated that immediately adjacent cells 10 can completely overlap. Similarly, the spiral of cells 10 does not have to be a complete circle. The repeating cycle may be within part of a circle. For example, cells 10 of a stack 23 may be divided into groups each consisting of a given number of cells 10. The cells 10 in each group may be spiraled to just within a 90° span and each group is stacked directly over one another.

The depiction of the fuel cell stack 23 in FIG. 2 is only partial insofar as the cells 10 are shown with only a single gas inlet 18 or 20 and a single gas outlet 19 or 21 for purposes of Illustration. It can be seen that a gas tube 25 extends from the gas inlet of each cell 10 and to a manifold assembly 26 disposed below the cells 10, when viewed from FIG. 2. Similarly, a gas tube 25 extends from the gas outlet of each cell 10 and to the manifold assembly 26. The gas tube 25 from the gas inlet enables a gas, such as fuel, to flow from the manifold assembly 26 and to the cell 10.

FIG. 2 is also a partial depiction of the fuel cell stack 23 insofar as the manifold assembly 26. The assembly 26 is shown as having a single inlet manifold 27 and a single outlet manifold 28. However, the manifold assembly 26 actually includes a pair of inlet manifolds and a pair of outlet manifolds, as further described below in reference to FIGS. 3A–C.

In still referring to FIG. 2, it can be seen that for this embodiment, the inlet manifold 27 has circular configuration located below the lowermost fuel cell 10, when viewed from FIG. 2. The manifold 27 can be a pipe, typically having a round cross section. It may be lying on a plane that is horizontal in position or that is in a tilted manner. The diameter of the inlet manifold 27 is preferably as much as or greater than the longest width of the fuel cells 10. Thereby, the outer perimeter of the inlet manifold 27 is operatively adjacent the outer perimeters of the fuel cells 10.

The outlet manifold 28 is also planar and circular in configuration. It is disposed within and concentric to the inlet manifold 27. A gas outlet 30 communicates with the outlet manifold 28 to allow the expulsion of a gas, such as a fuel or an oxidant, from at least one of the cells 10 via the tube 25. Likewise, a gas inlet 29 communicates with the inlet manifold 27 to provide a supply of gas, such as a fuel or an oxidant, to at least one of the cells 10 via the tube 25. Of course, it is preferred to have each of the cells 10 in gas communication with the inlet and outlet manifolds 27, 28. Stack support 24 provides a stand for the stack 23 to elevate the stack 23 with respect to the manifolds 27, 28 and/or the ground.

Figure 3A:
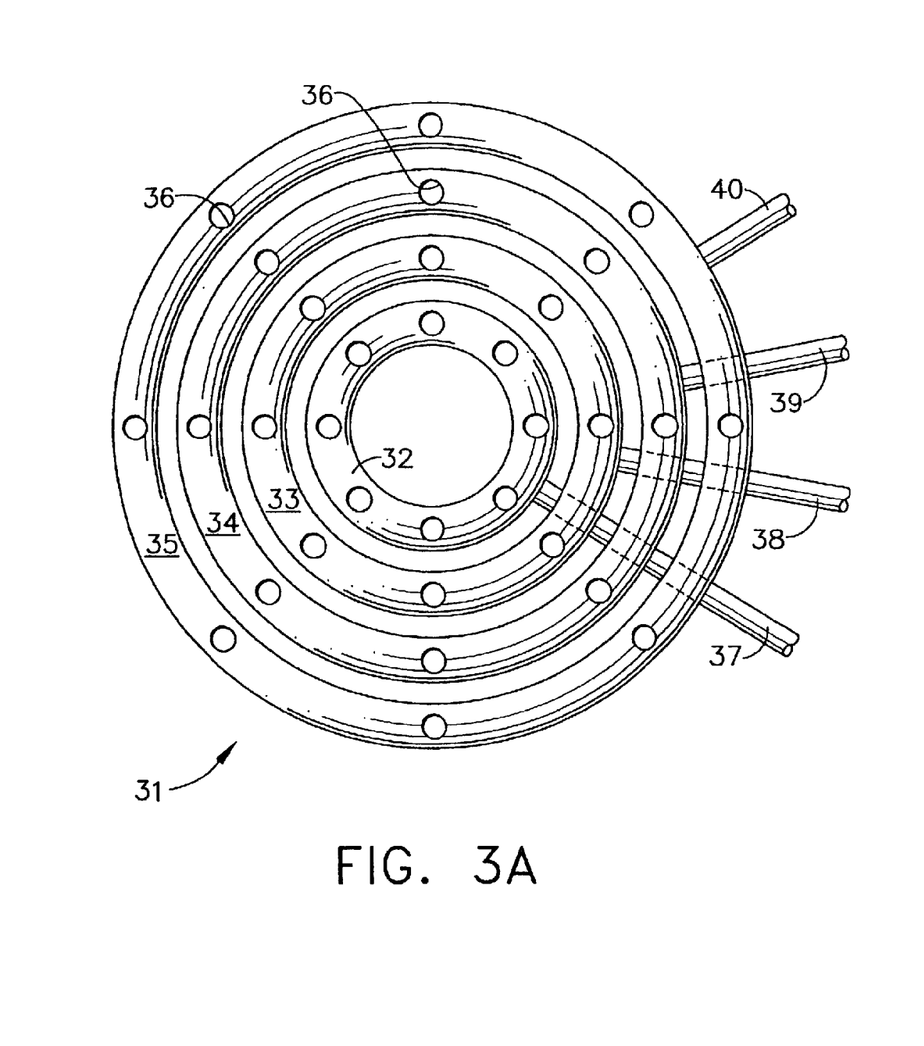
FIG. 3A is a top view of one embodiment of a manifold assembly that can be used in a fuel-cell stack according to the present invention.

FIG. 3A represents one preferred embodiment of a manifold assembly 31. In this embodiment, four planar and circular manifolds 32–35 are provided concentric to one another. The innermost manifold 32 has a diameter that is as much as or greater than the longest width of the fuel cells. The manifolds 32–35 can be either an inlet or outlet manifold to provide a pair of inlet manifolds and a pair of outlet manifolds. The manifolds 32–35 are respectively in gas communication with gas inlet/outlets 37–40.

A plurality of circumferentially spaced apart manifold openings 36 are provided in each of the manifolds 32–35 and are operatively adjacent to the outer perimeters of the fuel cells. The openings 36 provide gas communication between the gas tubes 25 and its respective manifold 32–35. Although openings are shown in FIG. 3A as being equally spaced apart for any one manifold 32–35, unequal spacing for one or more manifolds 32–35 is contemplated. Likewise, even though the openings 36 are shown as being in the same circumferential position from manifold-to-manifold, different circumferential positions are contemplated.

Figure 3B:
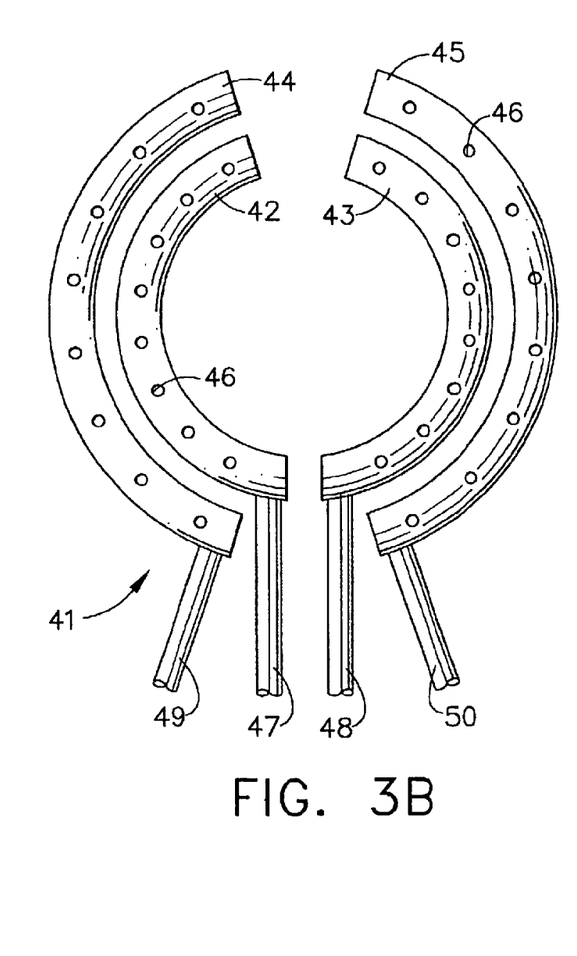
FIG. 3B is a top view of a second embodiment of a manifold assembly that can be used in a fuel cell stack according to the present invention.

FIG. 3B represents a second preferred embodiment of a manifold assembly 41. In this embodiment, four planar and semicircular manifolds 42–45 are provided in pairs. The pairs of manifolds 42–45 are oriented in two concentric circles. As in FIG. 3A, manifold openings 46 are provided in the manifolds 42–45 and spaced apart circumferentially.

The manifolds 42–45 can be either inlet or outlet manifolds and are connected to gas inlet/outlets 47–50.

Figure 3C:
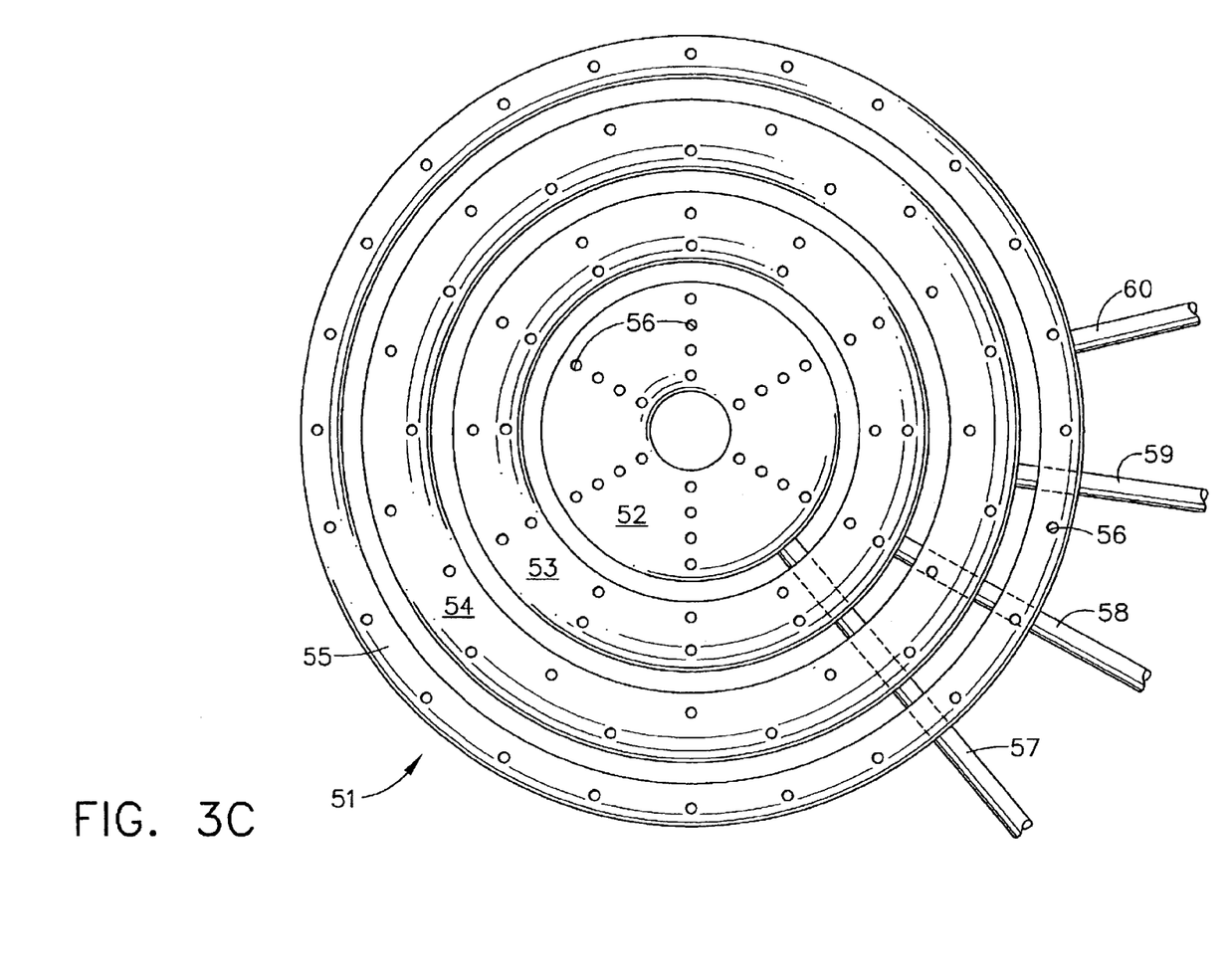
FIG. 3C is a top view of a third embodiment of a manifold assembly that can be used in a fuel cell stack according to the present invention.

FIG. 3C represents a third preferred embodiment of a manifold assembly 51. In this embodiment, four planar and circular manifolds 52–55 are provided concentric to one another. In contrast to the above embodiments, the manifolds 52–55 have different widths in their radial directions. Further, whereas the above embodiments provided single spaced apart manifold openings, the manifold openings 56 in the manifolds 52–55 are spaced apart in a plurality of openings 56. The manifolds 52–55 can be either inlet or outlet manifolds and are connected to gas inlet/outlets 57–60.

While the discussion above describes manifolding methods for bringing main line gases to the individual cells of a stack, the discussion below relates to methods of distributing the gases within the individual cells to the surface of the electrodes.

Figure 4A:
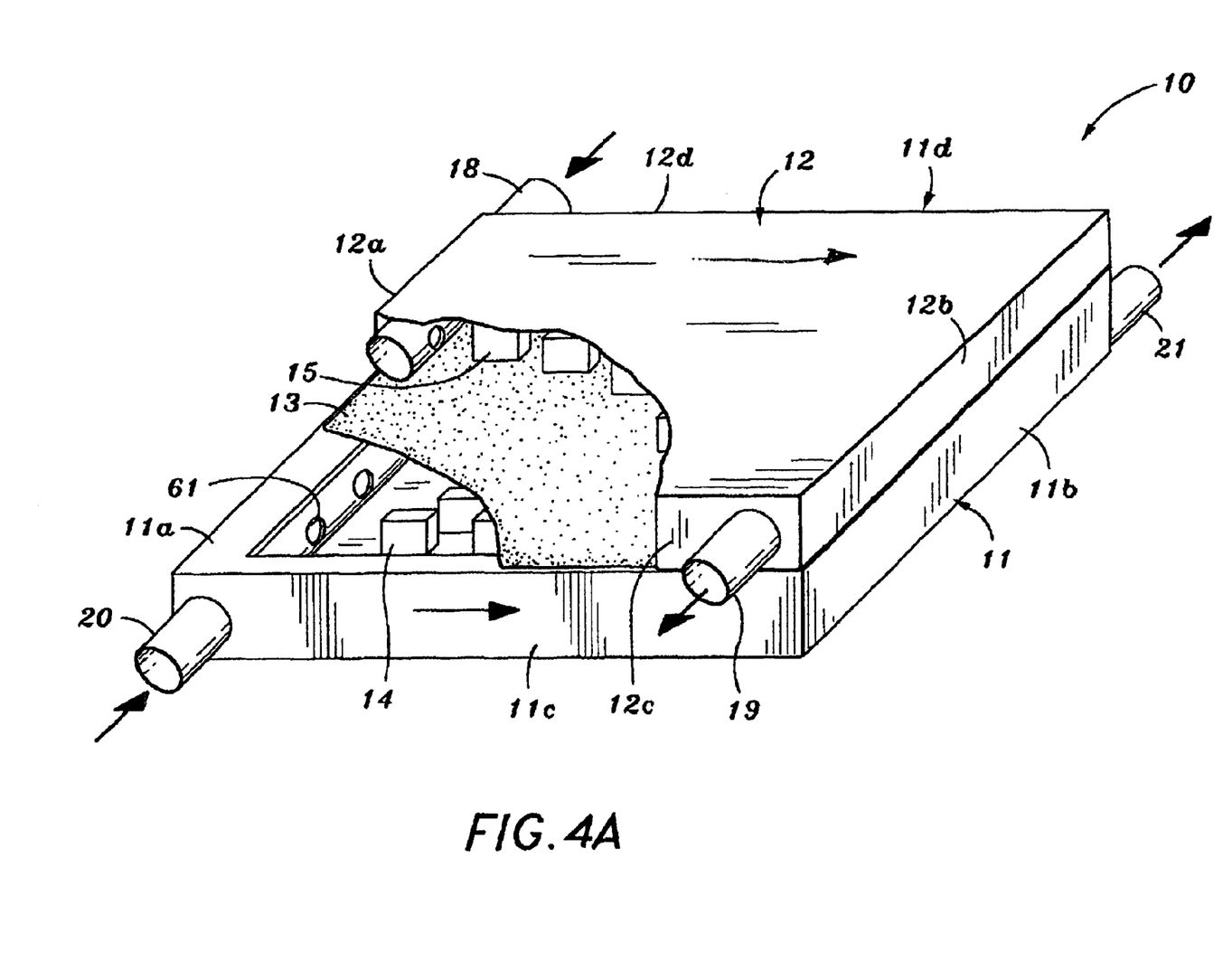
FIG. 4A is a perspective view of a unitized fuel cell having a first configuration of gas tubes wherein a co-flow pattern is provided according to an embodiment of the present invention.

FIG. 4A depicts a fuel cell 10 with a first configuration of gas tubes inside the fuel cell 10 according to an embodiment for distributing the gases within a cell according to the present invention. As in the above unitized cell embodiments, the fuel cell 10 includes a first planar interconnect 11 that interfaces a second planar interconnect 12. The first interconnect includes sides 11a, 11b, 11c, and 11d, while the second interconnect includes sides 12a, 12b, 12c, and 12d. The first and second interconnects 11, 12 contain a first gas distribution structure 14 and a second gas distribution structure 15, respectively. Together, they sandwich a ceramic cell 13.

Figures 4B, 4C:
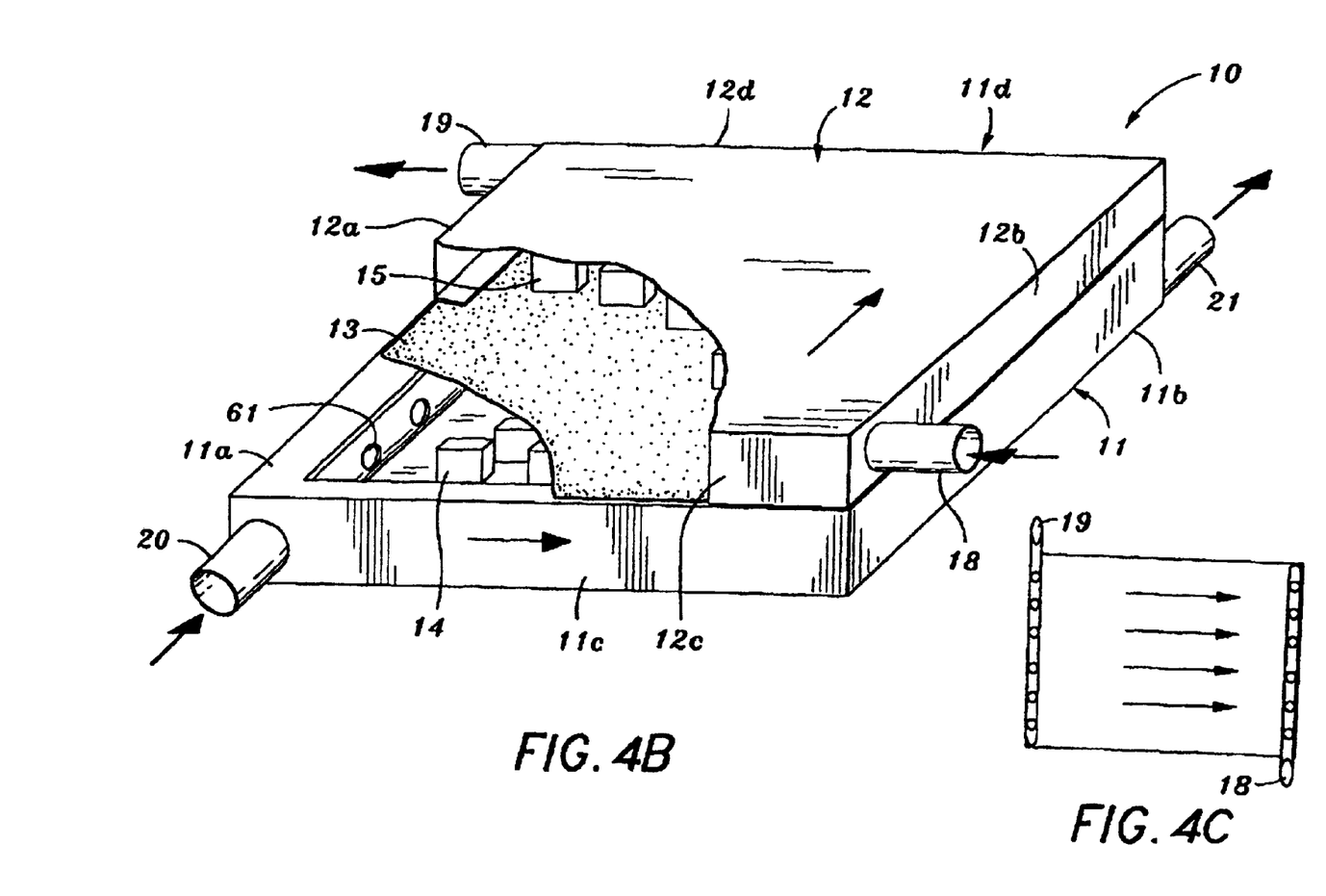
FIG. 4B is a perspective view of the unitized fuel cell of FIG. 4A wherein a cross flow pattern is provided according to another embodiment of the present invention.
FIG. 4C is a diagrammatical view of the flow from the gas tubes shown in FIGS. 4A and 4C.

However, unlike the embodiments above, a fuel inlet gas tube 20 may then be affixed at the side 11c such that the inlet tube 20 extends within the first interconnect 11 along the entire length of the side 11a for purposes of illustration. Via a plurality of openings or holes 61 in the inlet tube 20 that may extend along its entire length within the interconnect 11, an inlet gas in the tube 20 is in gas communication with the first gas structure 14 (FIG. 4C). A fuel outlet gas tube 21 may then be affixed at the side 11d such that the outlet tube 21 extends within the first interconnect 11 along the entire length of the side 11b for purposes of illustration. Via a plurality of openings or holes 61 in the outlet tube 21 that may extend along its entire length with the interconnect 11, an outlet gas in the tube 21 is in gas communication with the first gas structure 14.

Similarly, an oxidant inlet gas tube 18 may be affixed at the side 12c such that the inlet tube 18 extends within the second interconnect 12 along the entire length of the side 12b for purposes of illustration. Via openings or holes 61 in the inlet tube 18, an inlet gas in the tube 18 is in gas communication with the second gas structure 15 (FIG. 4C). An oxidant outlet gas tube 19 may then be affixed at the side 12d such that the outlet tube 19 extends within the second interconnect 12 along the entire length of the side 12a for purposes of illustration. Via openings or holes 61 in the outlet tube 19, an outlet gas in the tube 19 is in gas communication with the second gas structure 15.

As such, the fuel gas tubes 20, 21 may be parallel to the oxidant gas tubes 18, 19. The gas tubes are preferably made of metals that fit inside the interconnect skirt and are shorter in height compared to the gas structures 14, 15. The interconnect skirt refers to the vertical wall that surrounds sides 11a–d and 12a–d of each interconnect. The inside diameters of the gas tubes, depending on the cell size and gas flow requirements, can range between about 0.030 to 0.120 inches. The gas tubes typically are cylindrical with a straight body shape. Like the gas tubes, the inside diameter of the gas tube openings 61 also depend on the gas flow requirements, and typically can range between about 0.005 to 0.090 inches. The openings 61 are in gas communication with the gas outlet 20. Thereby, a gas (such as a fuel) may enter the inlet tube 21 and flow out of the openings 61 therein. The gas may then flow through the first gas distribution structure 14 and into the openings 61 of the outlet tube 20 for eventual discharge. In a similar fashion, a gas (such as an oxidant) may flow into inlet tube 18, out of the openings 61, across the second gas distribution structure 15, into the openings 61 of the outlet tube 19 for eventual discharge. The shapes of the gas tubes 18–21 and gas tube openings 61 are shown as cylindrical in FIGS. 4A and C since it is a common and economical shape to manufacture. However, gas tubes with different cross sections other than circular are contemplated.

Although the gas tubes are described as separate pieces inserted within the interconnect structures, they can also be formed as an integral part of the interconnects. For example, using sheet metal forming techniques, the sides of interconnects may be folded into tubes and the ends welded to the base for closure. Holes are then bored on the folded tubes.

In the embodiment of FIG. 4A, the cell 10 provides a co-flow of gases as shown by the arrows. Co-flow of gases is preferred over other flow patterns in some SOFCs for thermal management reasons. However, different types of flow patterns can also be used when preferred. Traditionally, spent fuel gas from the fuel outlet gas tube 21 and spent oxygen gas from the oxidant outlet gas tube 19 are combusted in a separate burner (not shown) to recover residual energy for enhancing system efficiency.

FIG. 4B depicts another embodiment of a first gas tube configuration for a manifold assembly of the present invention. This embodiment is the same as that of FIG. 4B, except that the placement of the tubes 18, 19 have changed relative to the second interconnect 12. In this embodiment, the inlet tube 18 extends into the interconnect 12 at side 12a and outlet tube 19 extends out of the side 12b. With such configuration of perpendicular oriented tubes, the gas flow pattern is cross flow as shown by the arrows.

Figures 5A, 5B:
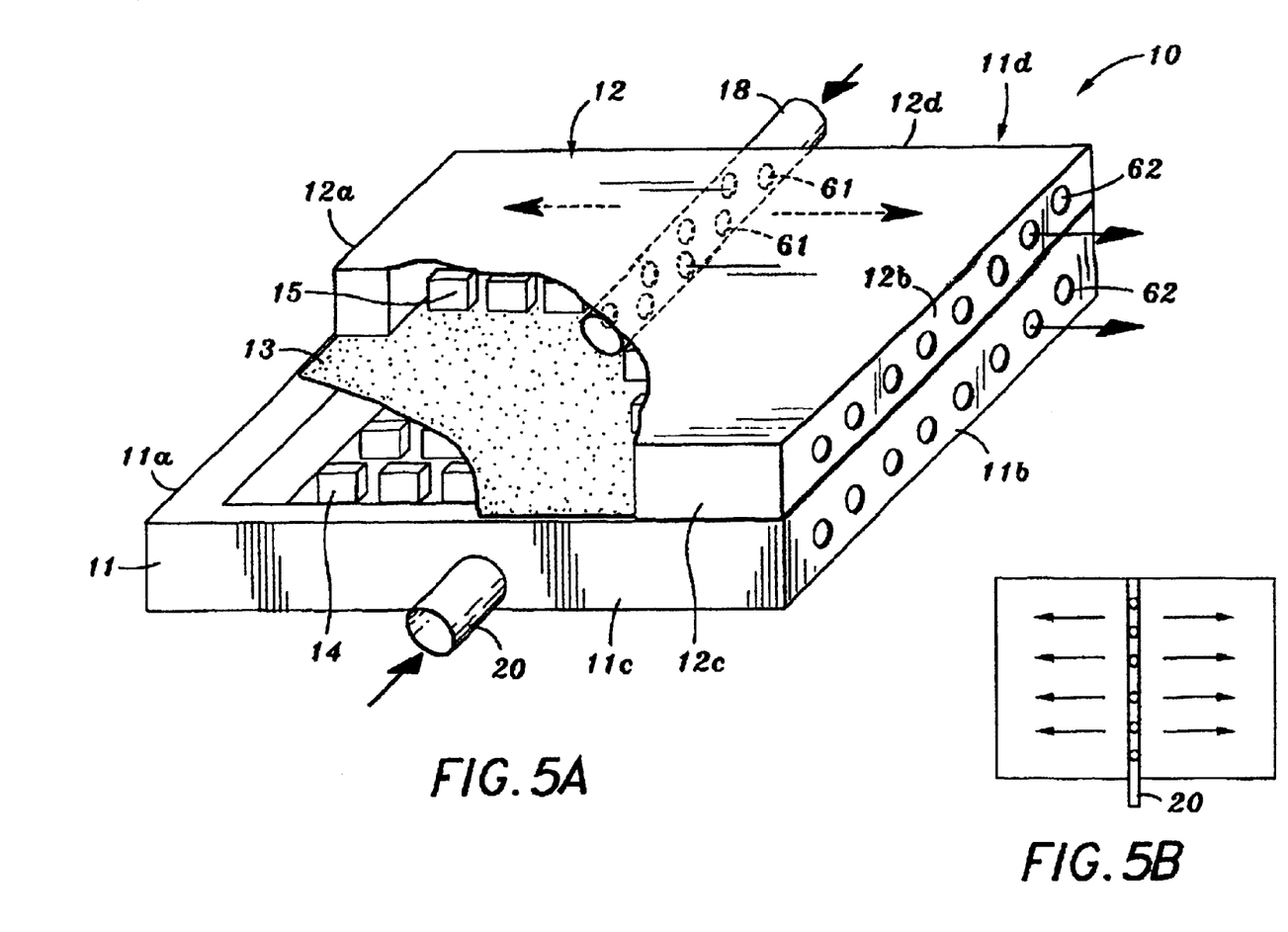
FIG. 5A is a perspective view of a unitized fuel cell with a second configuration of gas tubes according to the present invention.
FIG. 5B is a diagrammatical view of the flow from the gas tubes shown in FIG. 5A.

FIG. 5A depicts an embodiment of a second gas tube configuration for the present invention. In FIG. 5A, the fuel inlet gas tube 20 may be inserted into and near the middle of the first interconnect 11 at the side 11c while the oxidant inlet gas tube 18 may be inserted into and near the middle of the second interconnect 12 at the side 12d. The gas inlet tubes 18, 20 may be arranged in parallel to each other and directly over one another. Further, the tubes 18, 20 may extend through the entire lengths of the respective interconnects 12, 11. The tubes 18, 20 may each be provided with a plurality of openings 61 that can extend along the entire portions of the tubes 18, 20 that are disposed within the interconnects 11, 12, respectively. Thereby, gases can exit along the tubes 18, 20 and radiate out from the tubes in a co-flow pattern, as shown by the arrows in FIGS. 5A and 5B. As in the first gas tube configuration, the openings 61, depending on the gas flow requirements, may be on the order of about 0.005 to 0.090 inches in diameter. As the gases flow through the first and second gas distribution structures 14, 15, the gases may then exit through openings 62 in paired sides of the first and second interconnects 11, 12.

In the embodiment of FIG. 5A, there are no gas outlet tubes to collect spent gases since the spent gases are allowed to exit the cell 10 at two ends or sides that are open. In this embodiment, the sides or skirts 11a and 11b in the first interconnect 11 include openings 62 on their surfaces (not shown for side 11a). Likewise, the sides or skirts 12a and 12b in the second interconnect 12 include openings 62 on their surfaces (not shown for side 12a). These openings 62 may typically have inside diameters between about 0.005 to 0.090 inches. Consequently, the spent fuel gas exits from the sides of the cell 10 and then gets combusted by the spent oxidant along those sides whereby energy is recovered for enhanced system efficiency, but without the need for a separate burner.

Figures 6A, 6B:
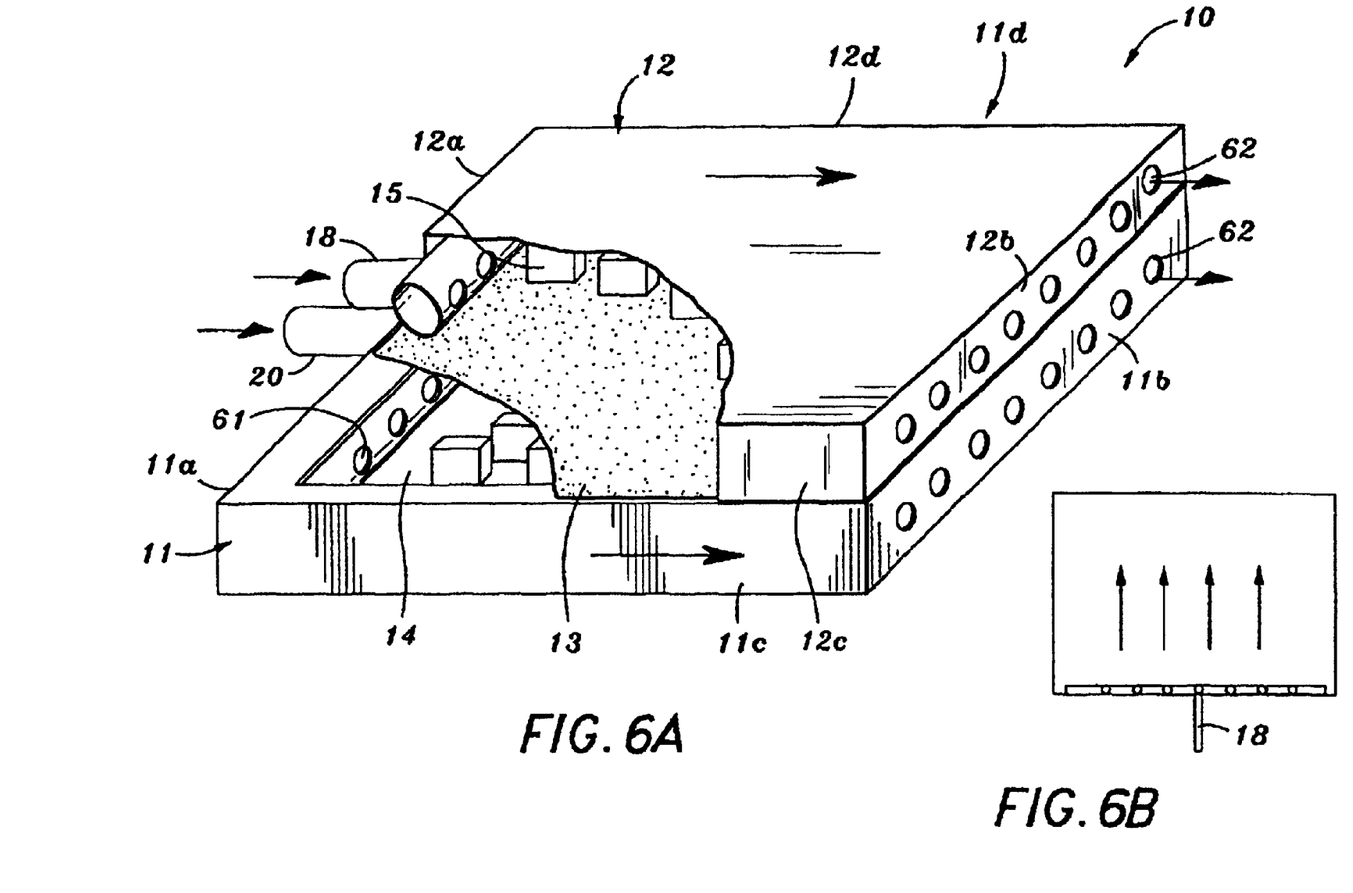
FIG. 6A is a perspective view of a unitized fuel cell with a third configuration of gas tubes according to the present invention.
FIG. 6B is a diagrammatical view of the flow from the gas tubes shown in FIG. 6A.

FIGS. 6A and 6B depict an embodiment of a third gas tube configuration with stubbed T-shaped gas inlet tubes affixed to and near the middle area of opposing sides of the interconnects 11, 12. The stubbed T-shaped gas inlet tubes can have a cross member portion and a base or inlet portion. The cross member portion is preferably perpendicular to the inlet portion. The cross member portion can be disposed within the first and second interconnects 11, 12, and may be disposed immediately adjacent the respective inlet portions of the first and second gas inlets 20, 18. The stubbed T-shaped gas tubes are preferably made of metals with inside diameters typically between about 0.030 to 0.120 inches. Openings 61 in the cross member portion can typically have inside diameters between about 0.030 to 0.120 inches. The openings 61 deliver inlet gases across the first gas distribution structure 14 and the second gas distribution structure 15 of the first interconnect 11 and the second interconnect 12 respectively.

Thus, in FIG. 6A, a fuel inlet gas tube 20 is affixed to the side or skirt 11a of the first interconnect 11 while an oxidant inlet gas tube 18 is affixed to the same side or skirt 12a of the second interconnect 12. The fuel and oxidant gases may then exit from the cross member portion of the tubes 18, 20 disposed at respective sides or skirts 12a and 12b, flow through the first and second gas distribution structures 14, 15, and then exit at the opposite end of the cell 10 via the openings 62 in the sides or skirts 11b and 12b. This configuration can provide a co-flow pattern.

Figures 7A, 7B:
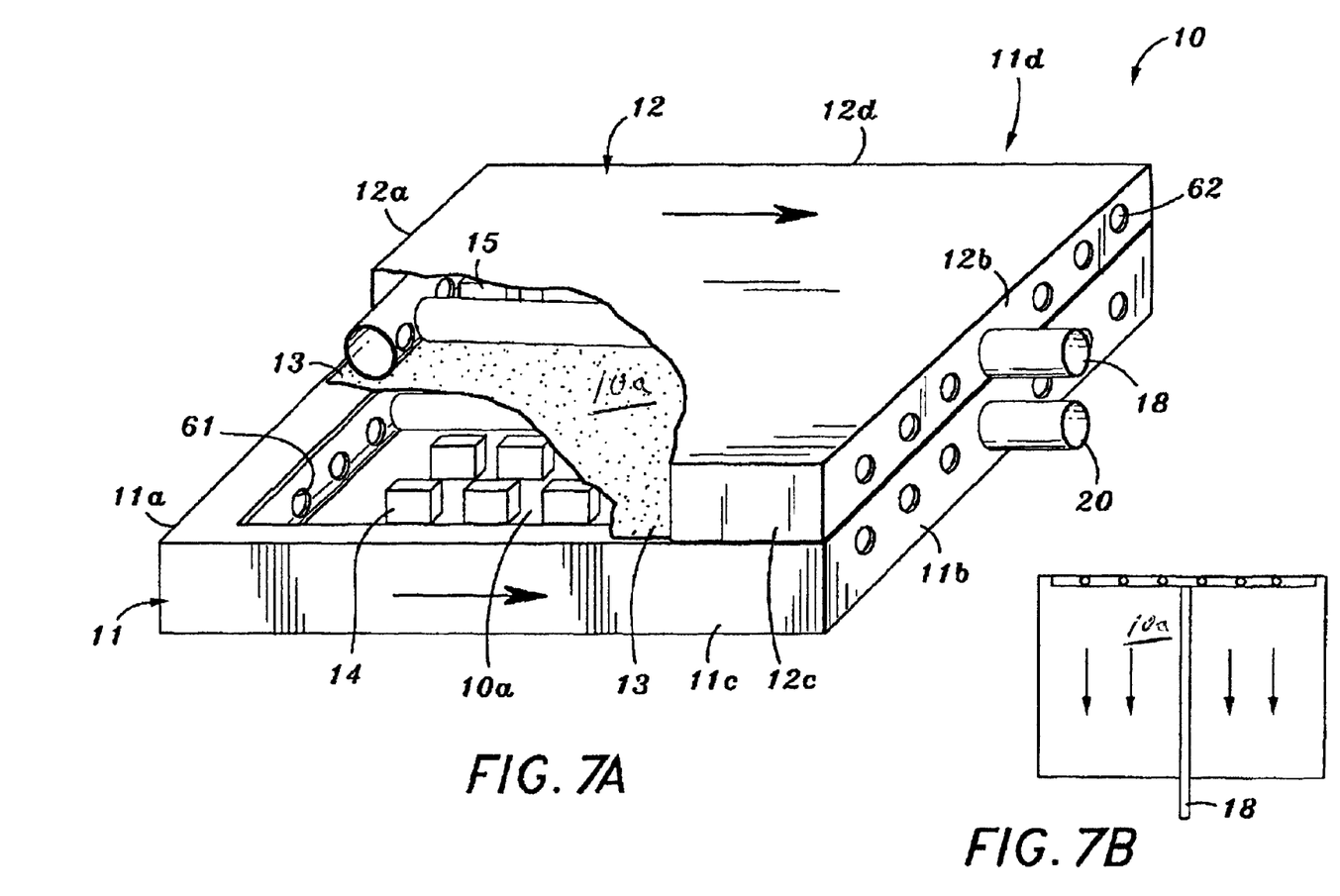
FIG. 7A is a perspective view of a unitized fuel cell with a fourth configuration of gas tubes according to the present invention.
FIG. 7B is a diagrammatical view of the flow from the gas tubes shown in FIG. 7A.

FIGS. 7A and 7B depict an embodiment of a fourth gas tube configuration having an extended T-shape affixed to and near the middle area of same sides of the interconnects 11, 12. The extended T-shaped gas tubes can have a cross member portion and a base or inlet portion. The cross member portion is preferably perpendicular to the inlet portion. The cross member portion may be disposed within the first and second interconnects 11, 12, but away from the inlet portions of the first and second gas inlet tube 20, 18 portions. The extended T-shaped gas tubes are preferably made of metals with inside diameters typically between about 0.030 to 0.120 inches. Like the stubbed T-shaped gas tubes in FIGS. 6A and 6B, the openings 61 are located on the surface of the cross member portion of the extended T-shape gas tubes. These openings 61 deliver inlet gases across the first gas distribution structure 14 and the second gas distribution structure 15 of the first interconnect 11 and the second interconnect 12, respectively.

In this embodiment, the fuel inlet gas tube 20 is affixed to the side or skirt 11b of the first interconnect 11, extends through the first gas distribution structure 14, and a cross member portion of the tube 20 is disposed adjacent the side or skirt 11a wherein such cross member portion includes a plurality of openings 61. Similarly, the oxidant inlet gas tube 18 is affixed to the side or skirt 12b, extends through the second gas distribution structure 15, and a cross member portion of the tube 18 is disposed adjacent the side or skirt 12a wherein such cross member portion includes openings 61. Thus, fuel and oxidant gases are flowed in from one side of the cell 10 and enter the gas distribution structures 14, 15 from a side of the cell that is opposite the entry. The gases then exit at the side of the cell 10 from where the gases entered. This provides a co-flow pattern as shown by the arrows in FIGS. 7A and 7B.

With the foregoing configuration of FIGS. 7A and 7B, a section of each gas tube extends through a combustion zone or hot section that is outside of the cell 10 along the sides 11b and 12b before being distributed to the cell 10. A heat exchange process takes place whereby the cold inlet gases in the tubes 18 and 20 pick up heat from the combusting gases oustside of the cell 10. After the gas tubes enter the cell, they run through the entire width of an active area 10a of the cell. Electrochemical reactions taking place in the active area 10a also generate heat that further heats up the gases in the gas tubes. In other words, the length and path of the tubes allow the gases inside to pick up enough heat so that when the gases come out of openings 61, their temperature is already close to the cell operating temperature (i.e., temperature at 10a). Without this heat exchange process, the temperature difference across the cell width, that is, between sides 11a and 12a and sides 11b and 12b will be significantly higher and create high thermal stresses between the two sides and within the cell that can damage the cell materials.

In view of the above, it can be seen that the present invention also provides a method of making a fuel cell stack 23. The method includes juxtaposing a plurality of planar fuel cells 10 to one another. Thereby, one interconnect of one fuel cell 10 oppositely faces another interconnect of an adjacent fuel cell. Further, the pair of interconnects in any one fuel cell 10 are positioned in a respective plane and the planes of all of the fuel cells 10 are substantially parallel to one another. The method further includes orienting the fuel cells 10 in a spiral configuration and interfacing a manifold assembly 26 to the fuel cells 10. Thereafter, the fuel cells 10 are placed in gas communication with the manifold assembly 26.

As can be appreciated by those skilled in the art, the present invention provides an improved solid oxide fuel cell stack and method of stacking such cells. Furthermore, the invention provides an improved gas communication path between the fuel cell stack 23 and manifold assembly 26. The fuel cell stack 23 design of the present invention incorporates unitized fuel cells 10 and minimizes the footprint of the stack 23. This is accomplished by having the manifold assembly 26 set directly below the stack 23. Another aspect of the present invention is a fuel cell stack 23 design that allows easy connection and disconnection of gases to the stack 23. By the use of convenient fittings, each of the gas tubes 24, 25 can be easily connected or disconnected to the manifold assembly 26 which allows any particular fuel cell 10 to be removed or replaced with little disturbance to adjacent cells 10.

The present invention further minimizes the thermal gradient that otherwise exists in a stack of cells. During power generation, a cell will be colder in the gas inlets 18, 20 because of the colder gases, and hotter in the gas outlets 19, 21 because of the heat generated from the reaction throughout the cell 10. If the cells 10 are stacked in a conventional way, one completely overlaying on the other, the outlet corners will be heated to much higher temperature due to combined generated heat from multiple fuel cells 10, that is usually a hundred of degrees Celcius or higher than the gas inlet corners. This can create tremendous thermal stress and material property gradient across the fuel cell stack 23. By setting the cells 10 into spiral configuration, the outlets are positioned offset from one to another and is capable of dispersing and distributing heat.

In a further aspect of the present invention, perforated gas tubes within the unitized fuel cells 10 arranged in different manners and orientation, provide a wide variety of gas distribution patterns on the ceramic cell surfaces 13.

It should be understood, of course, that the foregoing relates to preferred embodiments of the invention and that modifications may be made without departing from the spirit and scope of the invention as set forth in the following claims.

We claim:

1. An single, self-contained, replaceable solid oxide fuel cell, comprising:
    a planar first interconnect that allows a first gas to flow therein;
    a planar ceramic cell adjacent said first interconnect;
    a planar second interconnect adjacent said ceramic cell, said second interconnect allows a second gas to flow therein;
    a plurality of gas tubes in gas communication with said ceramic cell, said gas tubes comprising:
        a first gas inlet affixed to said first interconnect;
        a second gas inlet affixed to said second interconnect;
        a first gas outlet in communication with said first gas inlet; and
        a second gas outlet in communication with said second gas inlet.

2. The single, self-contained, replaceable fuel cell of claim 1, wherein at least one of said first and second gas outlets comprise a tube affixed to at least one of said first and second interconnects.

3. The single, self-contained, replaceable fuel cell of claim 1, wherein at least one of said first and second gas outlets comprise a plurality of openings in at least one of said first and second interconnects.

4. The single, self-contained, replaceable fuel cell of claim 1, wherein said first and second gas inlets have cylindrical shapes.

5. The single, self-contained, replaceable cell of claim 1, wherein said first gas inlet is affixed adjacent an intersection of two sides of said first interconnect and said second gas inlet is affixed adjacent an intersection of two sides of said second interconnect.

6. The single, self-contained, replaceable fuel cell of claim 1, wherein said first gas inlet is affixed at a middle area of a side of said first interconnect and said second gas inlet is affixed at a middle area of a side of said second interconnect.

7. The single, self-contained, replaceable fuel cell of claim 1, wherein said first gas inlet is disposed substantially parallel to said second gas inlet.

8. The single, self-contained, replaceable fuel cell of claim 1, wherein said first gas inlet is disposed substantially perpendicular to said second gas inlet.

9. The single, self-contained, replaceable fuel cell of claim 1, wherein said plurality of tubes have a straight shape.

10. The single, self-contained, replaceable fuel cell of claim 1, wherein said plurality of gas tubes have a T-shape.

11. The single, self-contained, replaceable fuel cell of claim 10; wherein said plurality of gas tubes have a cross member portion and an inlet portion.

12. The single, self-contained, replaceable cell of claim 11, wherein said cross member portion is disposed within at least one of said first and second interconnects, and said cross member portion is disposed immediately adjacent said inlet portion.

13. The single self-contained, replaceable cell of claim 12, wherein said gas tubes have a stubbed T-shape.

14. The single, self-contained, replaceable cell of claim 11, wherein the cross member portion is disposed within at least one of said first and second interconnects, and said cross member portion is disposed away from said inlet portion.

15. The single, self-contained, replaceable fuel cell of claim 14, wherein said gas tubes have an extended T-shape.

16. An single, self-contained, replaceable solid oxide fuel cell, comprising:
    a planar first interconnect that allows a fuel to flow therein;
    a planar ceramic cell adjacent said first interconnect;
    a planar second interconnect adjacent said ceramic cell, said second interconnect allows an oxidant to flow therein;
    a plurality of gas tubes in gas communication with said ceramic cell, said gas tubes comprising:
    a fuel inlet affixed to said first interconnect;
    an oxidant inlet affixed to said second interconnect;
    a fuel outlet affixed to said first interconnect; and
    an oxidant outlet affixed to said second interconnect.

17. The single, self-contained, replaceable fuel cell of claim 16, wherein said first interconnect includes a first side, a second side, a third side, and a fourth side.

18. The single, self-contained, replaceable fuel cell of claim 17, wherein said second interconnect includes a first side, a second side, a third side, and a fourth side.

19. The single, self-contained, replaceable fuel cell of claim 18, wherein:
    said first side of first interconnect is adjacent said first side of said second interconnect and on opposite sides of said cell; and
    said second side of said first interconnect is adjacent said second side of second interconnect and on opposite sides of said cell.

20. The single, self-contained, replaceable fuel cell of claim 19, wherein:
    said fuel inlet is secured in said first side of said first interconnect;
    said fuel outlet is secured in said second side of said first interconnect;
    said oxidant inlet is secured in said second side of said second interconnect; and
    said oxidant outlet is secured in said first side of said second interconnect.

21. The single, self-contained, replaceable fuel cell of claim 20, wherein the fuel and oxidant flow in a co-flow pattern.

22. The single, self-contained, replaceable fuel cell of claim 19, wherein:
    said fuel inlet is secured in said first side of said first interconnect;
    said fuel outlet is secured in said first side of said first interconnect;
    said oxidant inlet is secured in said first side of said second interconnect; and
    said oxidant outlet is secured in said first side of said second interconnect.

23. The single, self-contained, replaceable fuel cell of claim 22, wherein the fuel and oxidant flow in a co-flow pattern.

24. The single, self-contained, replaceable fuel cell of claim 19, wherein:
    said third side of first interconnect is adjacent said third side of said second interconnect and on opposite sides of said cell; and said fourth side of said first interconnect is adjacent said fourth side of second interconnect and on opposite sides of cell.

25. The single, self-contained, replaceable fuel cell of claim 24, wherein:

said fuel inlet is secured in said first side of said first interconnect;

said fuel outlet is secured in said second side of said first interconnect;

said oxidant inlet is secured in said third side of said second interconnect; and said oxidant outlet is secured in said fourth side of said second interconnect.

26. The single, self-contained, replaceable fuel cell of claim 25, wherein the fuel and oxidant flow in a cross flow pattern.

27. The single, self-contained, replaceable fuel cell of claim 24, wherein:

said fuel inlet is secured in said first side of said first interconnect;

said fuel outlet is secured in said third side of said first interconnect;

said oxidant inlet is secured in said second side of said second interconnect;

said oxidant outlet is secured in said third side of said second interconnect.

28. The single, self-contained, replaceable fuel cell of claim 27, wherein the fuel and oxidant flow in a co-flow pattern.

* * * * *